United States Patent [19]

Young

[11] Patent Number: 5,379,619

[45] Date of Patent: * Jan. 10, 1995

[54] ANTI-THEFT BRAKE LOCKING DEVICE FOR VEHICLES

[76] Inventor: Leonard Young, 2830 W. Highland Blvd., Apt. #104, Milwaukee, Wis. 53208

[*] Notice: The portion of the term of this patent subsequent to Feb. 10, 2008 has been disclaimed.

[21] Appl. No.: 376,810

[22] Filed: Jul. 7, 1989

[51] Int. Cl.⁶ .................................. F16H 57/00
[52] U.S. Cl. ................................ 70/202; 70/204; 70/199
[58] Field of Search ................... 70/201–206, 70/198–200

[56] References Cited

U.S. PATENT DOCUMENTS

| 1,263,731 | 4/1918 | Baker | 70/200 |
| 1,316,587 | 9/1919 | Miller | 70/200 |
| 1,343,807 | 6/1920 | Berryhill et al. | 70/199 |
| 1,348,840 | 8/1920 | Balestrino et al. | 70/200 |
| 1,411,728 | 4/1922 | Hogg | 70/200 |
| 1,442,203 | 1/1923 | Williams et al. | 70/202 |
| 1,444,379 | 2/1923 | Jones | 70/202 |
| 1,550,092 | 8/1925 | Morton | 70/198 X |
| 1,585,962 | 5/1926 | Bray | 70/202 |
| 2,103,089 | 12/1937 | Pichucki | 70/202 |
| 4,747,465 | 5/1988 | Hodgson | 70/200 X |

FOREIGN PATENT DOCUMENTS 297498 9/1928 United Kingdom .................. 70/200

Primary Examiner—Robert L. Wolfe
Assistant Examiner—Suzanne L. Dino
Attorney, Agent, or Firm—Andrus, Sceales, Starke & Sawall

[57] ABSTRACT

An anti-theft brake locking mechanism for a motor vehicle. The motor vehicle includes one or more brake pedals disposed adjacent an interior surface of the vehicle. The anti-theft brake locking mechanism selectively maintains the brake pedal in a depressed position so as to actuate the vehicle brakes in order to prevent movement of the vehicle. The mechanism includes a hook portion engageable with the brake pedal stem, a neck to which the hook portion is mounted, and a base portion. The base portion is selectively secureable to and releaseable from a pedestal mounted to the vehicle floorboard.

5 Claims, 1 Drawing Sheet

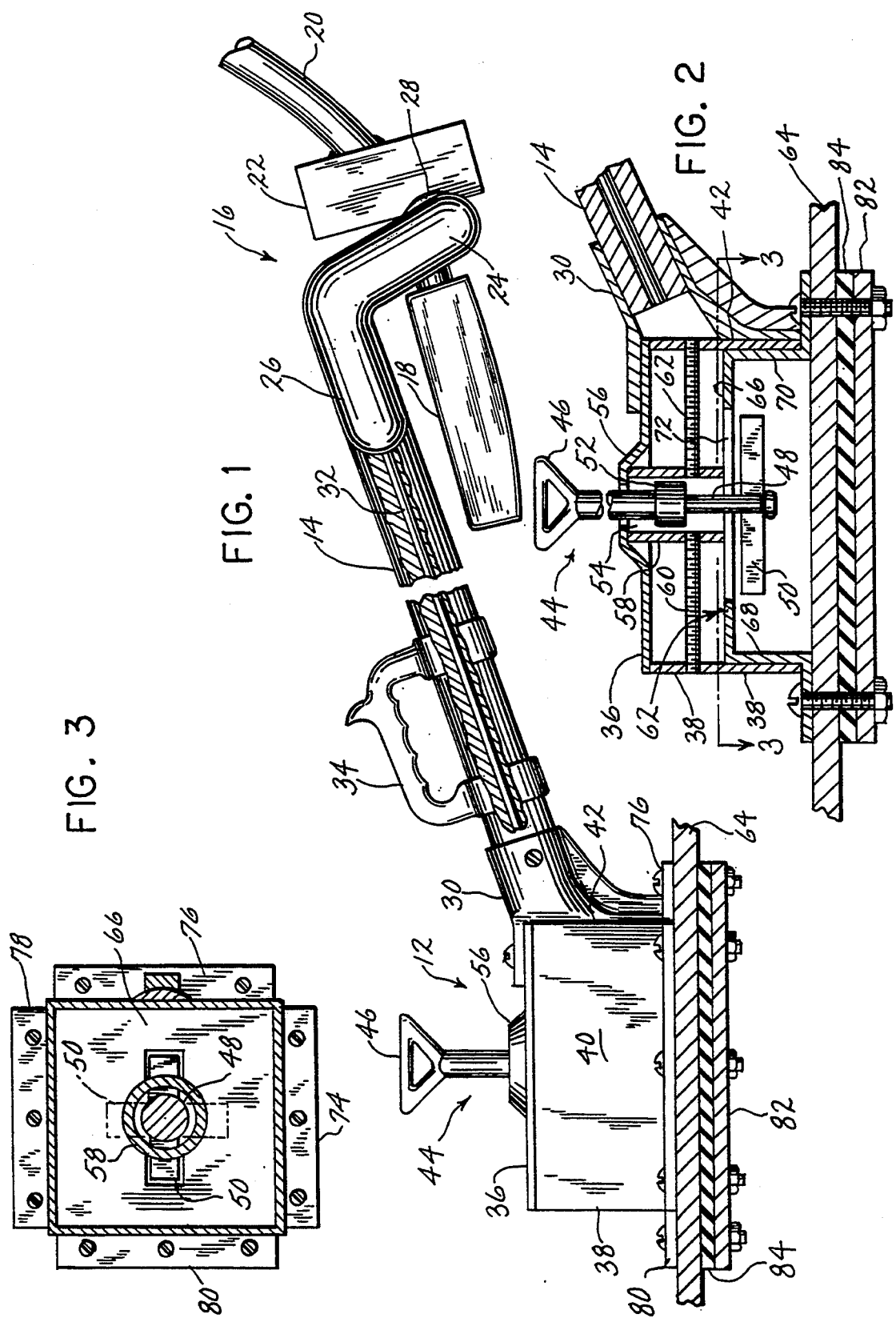

ANTI-THEFT BRAKE LOCKING DEVICE FOR VEHICLES

BACKGROUND AND SUMMARY

This invention relates to an anti-theft device for a vehicle.

Various devices are known for interacting with various components of a vehicle, such as an automobile or the like, in an effort to prevent theft of the vehicle. It has been found that many of such devices are ineffectual in achieving this purpose so that, not withstanding presence of such a device on a vehicle, the vehicle can nonetheless be stolen.

This invention takes a different approach to preventing theft of a vehicle. In accordance with the invention, an anti-theft device is provided for a motor vehicle including a brake pedal disposed adjacent an interior surface of the vehicle. The anti-theft device comprises pedal engaging means, and retaining means connected to the pedal engaging means. The retaining means is selectively secureable to the interior surface of the vehicle for retaining the brake pedal in its depressed position, wherein the vehicle brakes are engaged. In this manner, movement of the vehicle is prevented when the retaining means is secured to the vehicle surface. When the retaining means is disconnected from the vehicle surface, movement of the vehicle is again allowed due to release of the brake pedal. In a preferred embodiment, the pedal engaging means comprises a hook-like member formed at the end of a neck extending outwardly from a base. A pedestal is firmly secured to the interior surface of the vehicle. The base is selectively mountable to and demountable from the pedestal. When the hook member is engaged with the brake pedal and the base secured to the pedestal, the brake pedal is maintained in its depressed position, wherein the brakes of the vehicle are engaged and movement of the vehicle is prevented. To assist in maintaining engagement of the hook member with the brake pedal, a block is preferably mounted to the brake pedal stem adjacent the upper surface of the brake pedal.

BRIEF DESCRIPTION OF THE DRAWINGS

The drawings illustrate the best mode presently contemplated of carrying out the invention.

In the drawings:

FIG. 1 is a side elevation view, partially in section, of the anti-theft brake locking mechanism of the invention, showing connection to the brake pedal of a vehicle;

FIG. 2 is a an enlarged partial sectional view of a portion of FIG. 1, showing details of the base and pedestal; and FIG. 3 is a sectional view taken generally along line 3—3 of FIG. 2.

DETAILED DESCRIPTION OF THE PREFERRED EMBODIMENT

As shown in FIG. 1, an anti-theft brake locking mechanism for a motor vehicle is shown generally at 10. The anti-theft brake locking mechanism includes a base portion shown generally at 12, a neck portion shown generally at 14, and a hook member shown generally at 16. These components are preferably constructed of a rigid sturdy material such as a satisfactory grade of steel.

An automobile brake pedal is shown at 18, and pedal 18 is connected to the lower end of a stem 20. A block 22 is secured to stem 20 in a satisfactory manner, such as by welding or the like. As shown, block 22 is spaced forwardly of the upper surface of pedal 18.

Hook member 16 comprises a U-shaped member including a pair of depending legs, one of which is shown at 24. Hook member 16 is adapted to engage brake stem 20 in a manner such as is shown in FIG. 1, wherein the lower surface of the U-shaped hook is disposed below brake stem 20, with the legs of the U-shaped hook receiving brake stem 20 therebetween. Hook member 16 is secured to, or integrally formed with, the distal end of neck 14. A rearwardly extending portion 26 is provided at the upper end of leg 24 of hook member 16, which extends substantially parallel to neck 14. Hook member 16 is mounted to brake stem 20 so as to engage brake stem 20 and a slot 28 milled into block 22, which is adapted to receive the lower portion of U-shaped hook member 16.

Neck 14 is mounted at its rearward end to a collar 30, which is secured to base 12. A reinforcing rod, shown at 32, is placed within neck 14 to provide added security. Reinforcing rod 32 is preferably formed of a hardened metal, which is difficult to cut such of by means of a hack saw. In this manner, any attempt to tamper with the anti-theft brake locking mechanism of the invention is further thwarted.

A handle 34 is secured to neck 14 towards its rearward end, which is adapted to receive the hand of a user.

Base portion 12 comprises a box-like member including an upper surface 36 and depending side surfaces, shown at 38, 40 and 42. Base portion 12 is open at its bottom. A locking mechanism, shown at 44, is mounted to upper surface 36. Locking mechanism 44 includes a key 46 and internal locking structure including a shaft 48 to which a locking bar 50 is mounted. A key-receiving head 52 is provided at the upper end of shaft 48. Head 52, shaft 48 and bar 50 are rotatably mounted within a passage 54 disposed below a raised portion 56 provided at upper surface 36 of base 12. Passage 54 is defined by a cylinder 58 welded to the underside of raised portion 56. A pair of studs 60, 62 are provided to reinforce cylinder 58.

With reference to FIGS. 2 and 3, a pedestal structure, shown generally at 62, is adapted for mounting to the floorboard, shown at 64, of the vehicle. Pedestal structure 62 includes an upper surface 66 and depending side surfaces, shown in FIG. 2 at 68, 70. A rectangular opening, shown at 72, is formed in upper surface 66. Base members 74, 76, 78 and 80 are mounted to the lower ends of the side walls of pedestal 62, and are adapted for securement to a plate 82 provided below floorboard 64 through a satisfactory securing arrangement, such as threaded bolts and nuts. A rubber gasket 84 is disposed between plate 82 and the underside of floorboard 64 for sealing the openings through floorboard 64 which accommodate passage of the bolts therethrough.

In operation, the anti-theft brake locking mechanism of the invention works as follows. The user first depresses brake pedal 18 so as to engage the vehicle brakes. Hook member 16 is then mounted to brake stem 20 in a manner as shown in FIG. 1, wherein the lower portion of the U-shaped hook member is disposed below brake stem 20 and the legs of hook member 16 enclose brake stem 20. While grasping handle 34, the user moves base portion 12 downwardly so as to mount base portion 12 to pedestal 62, as shown in FIGS. 1 and 2. Locking bar 50 is placed in its release position, wherein it passes through opening 72 as base portion 12 is mounted to pedestal 62. Once the position of FIGS. 1 and 2 is attained, key 46 is inserted into key-receiving head 52, and twisted 90° clockwise or counter-clockwise so as to place locking bar 50 in its locking position, shown in dotted lines at FIG. 3. When this occurs, base portion 12 is secured to pedestal 52 so that uplifting of base portion 12 is prevented. Key 46 is then removed, and the vehicle is maintained in position due to engagement of the brakes by continued depression of brake pedal 18. When it is desired to release brake pedal 18 to operate the vehicle, the above-described steps are reversed.

Various alternatives and modifications are contemplated as being within the scope of the following claims particularly pointing out and distinctly claiming the subject matter regarded as the invention.

I claim:

1. An anti-theft device for a motor vehicle including a brake pedal disposed adjacent an interior surface of said vehicle and mounted to the end of a stem, comprising:

pedal engaging means comprising a hook member mounted to the distal end of a neck, said neck being secured to a base;

hook engaging means mounted to said stem; and releasable retaining means connected said pedal engaging means, and located rearwardly of the brake pedal for selectively securing said base to the interior surface of said vehicle, so that said brake pedal can be maintained in a depressed position wherein movement of said vehicle is prevented when said base is secured to said vehicle surface, and said brake pedal can be released by releasing said retaining means so as to allow movement of said vehicle.

2. The anti-theft device of claim 1, wherein said retaining means comprises a pedestal mounted to said vehicle surface, and means provided on said base for releasably securing said base to said pedestal.

3. The anti-theft device of claim 2, wherein said base is secureable to and releaseable from said pedestal by means of a user-operated locking mechanism associated with said base.

4. The anti-theft device of claim 3, wherein said locking mechanism comprises a key-operated locking bar selectively engageable with said pedestal.

5. The anti-theft device of claim 1, wherein said neck portion includes a reinforcing rod for preventing said neck from being cut.

* * * * *